(12) United States Patent
Himmelmann

(10) Patent No.: US 8,191,576 B2
(45) Date of Patent: Jun. 5, 2012

(54) QUICK DISCONNECT UTILIZING GUILLOTINE VALVES

(75) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1042 days.

(21) Appl. No.: 12/128,880

(22) Filed: May 29, 2008

(65) Prior Publication Data

US 2009/0294716 A1 Dec. 3, 2009

(51) Int. Cl.
*F16L 37/28* (2006.01)
(52) U.S. Cl. .............................. 137/614.06; 137/614.02
(58) Field of Classification Search . 137/614.01–614.06
See application file for complete search history.

(56) References Cited

U.S. PATENT DOCUMENTS

| | | | | |
|---|---|---|---|---|
| 2,828,146 | A | * | 3/1958 | Abbey ..................... 137/614.01 |
| 3,487,765 | A | | 1/1970 | Lang |
| 3,897,091 | A | * | 7/1975 | McMath et al. ......... 137/614.06 |
| 4,356,838 | A | | 11/1982 | Morello |
| 4,483,509 | A | | 11/1984 | Lewcock |
| 4,880,032 | A | | 11/1989 | Doutt |
| 5,419,354 | A | * | 5/1995 | Krynicki .................. 137/614.06 |
| 5,439,198 | A | | 8/1995 | Reed |
| 5,483,993 | A | | 1/1996 | Roebelen |
| 6,453,944 | B2 | | 9/2002 | Bartlett |
| 6,533,241 | B1 | | 3/2003 | Chen |
| 7,080,591 | B2 | | 7/2006 | Doherty |
| 7,159,614 | B2 | | 1/2007 | Tiziani |
| 7,309,057 | B2 | | 12/2007 | Santiago |

* cited by examiner

*Primary Examiner* — Kevin Lee
(74) *Attorney, Agent, or Firm* — Carlson, Gaskey & Olds, PC

(57) ABSTRACT

A quick disconnect valve including a first connector with a first shutoff gate and a second connector with a second shutoff gate. A fluid flow passage is located in the first connector and the second connector. The first shutoff gate and the second shutoff gate include an aperture and are movable between a fully open first position to allow fluid flow through the fluid passage and a fully closed second position to prevent fluid flow through the fluid passage.

15 Claims, 18 Drawing Sheets

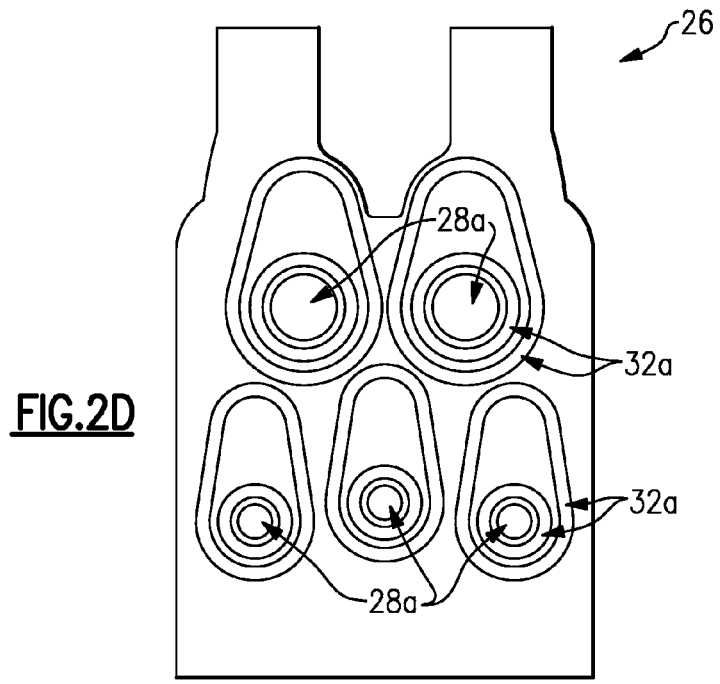
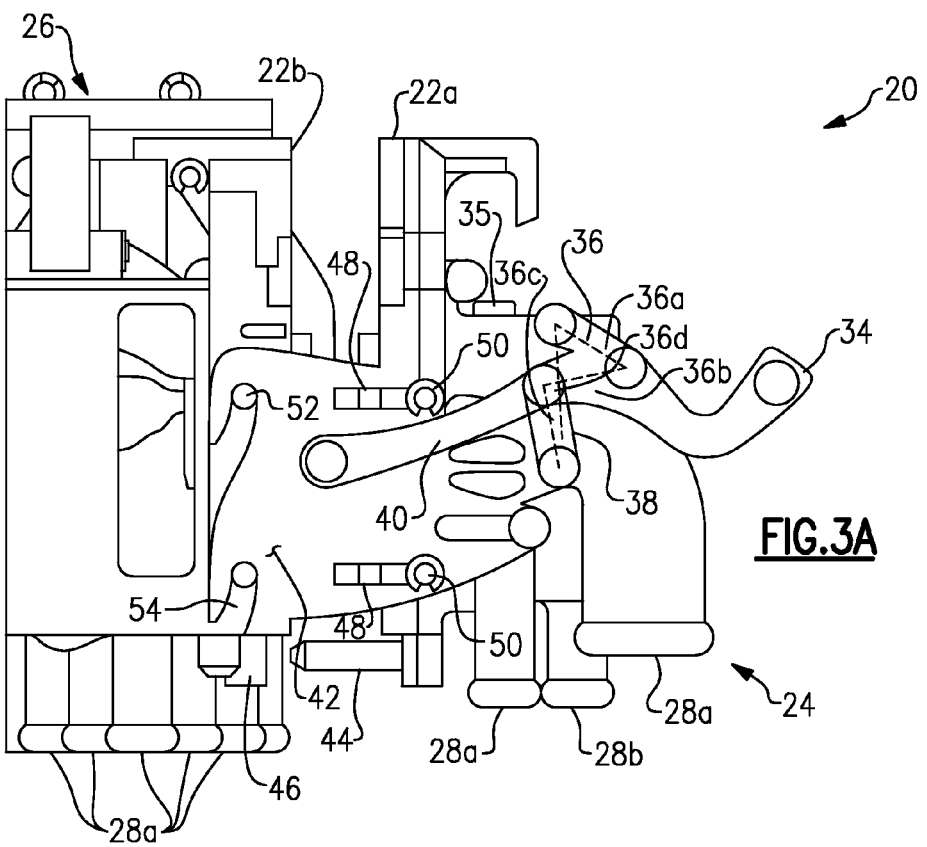

QUICK DISCONNECT UTILIZING GUILLOTINE VALVES

BACKGROUND OF THE INVENTION

This disclosure relates to a quick disconnect valve assembly and, more particularly, to a quick disconnect valve that facilitates maintaining a connection to a life support suit.

Quick disconnect valves allow for fluid flow lines to quickly couple and de-couple. Quick disconnect valves include simple hydraulic fittings, face seal fittings, and flared fittings. In general, quick disconnect valves incorporate a spring-loaded poppet valve on each connector half to stop the fluid from flowing when the two halves are separated. When the two connector halves are pushed together, the spring-loaded poppet valves move against the bias force of the spring from the sealed position to an open flow position.

A drawback to using spring-loaded poppet valves is that the spring-loaded poppet valves require a relatively large package envelope for the valves, the seals, and the spring assemblies. Therefore, the diameter of the fluid flow path through a typical spring-loaded poppet valve is much smaller than the overall diameter of the connector. Furthermore, assembly of the valve halves requires a relatively large force to overcome the spring force of the spring-loaded poppet valves. Finally, the use of the spring-loaded poppet valves causes a relatively large pressure drop between the valve halves for a given size and flow rate, when compared to a similarly sized unobstructed flow path.

SUMMARY OF THE INVENTION

An example quick release valve includes a first connector with a fluid passage and a second connector with a fluid passage. The first connector and the second connector each include a shutoff gate with an aperture. When the first connector and the second connector are mated, the shutoff gates can be aligned to permit or to prevent fluid from flowing through the first connector and the second connector.

The first connector includes at least one attachment plate moveable relative to the first connector for attaching the first connector to the second connector. A latch handle is in communication with the first connector to mate the first connector to the second connector.

An example method of operating the quick disconnect valve includes attaching the first connector to the second connector. The first connector and the second connector are mated by moving a handle until the first connector and the second connector engage. A locking mechanism prevents the valve from decoupling when the fluid flow passages are open.

BRIEF DESCRIPTION OF THE DRAWINGS

These and other features of the present invention can be best understood from the following specification and drawings, the following of which is a brief description:

FIG. 2D is a sectional view of a plurality of fluid flow passages of the valve;
FIG. 3A illustrates a side view of the valve.

DETAILED DESCRIPTION OF THE PREFERRED EMBODIMENT

Figure 1:
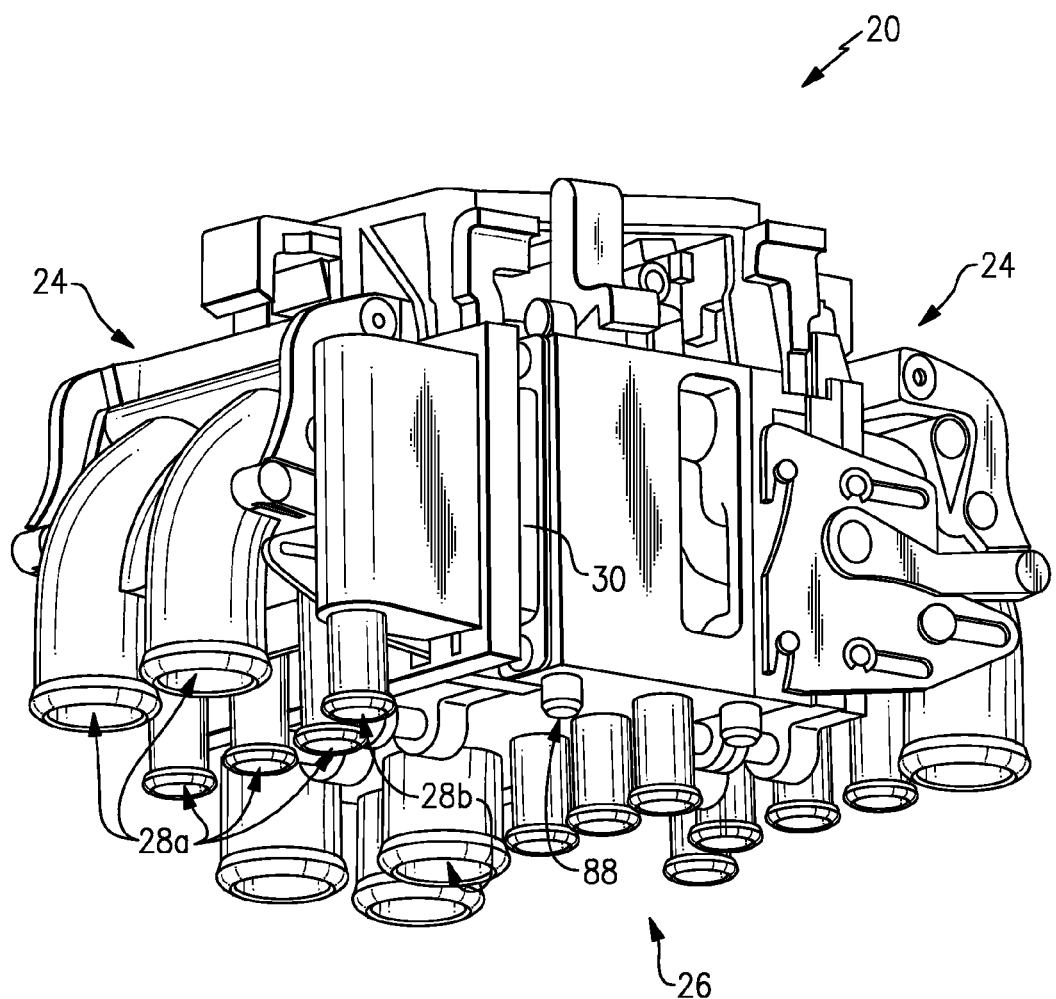
FIG. 1 is a perspective front view of an example valve.

FIG. 1 illustrates a general perspective view of a quick disconnect valve 20. The quick disconnect valve 20 can be used to quickly mate multiple fluid passages and is moveable between a fully open position to allow fluid flow and a fully closed position to prevent fluid flow. The quick disconnect valve 20 may be integrated into a specialized suit 227; for example, but can also find use in other types of applications.

The quick disconnect valve 20 includes a first connector 24 and a second connector 26. The first connector 24 and the second connector 26 have at least one fluid flow passage 28a and/or at least one electrical passage 28b. An electrical connection 30 is formed between the first connector 24 and the second connector 26.

A first shutoff gate 22a and a second shutoff gate 22b move simultaneously to either a fully open position by aligning at least one fluid flow passage 28c with the fluid flow passage 28a, or a fully closed position by blocking the fluid flow passages 28a with the first shutoff gate 22a and the second shutoff gate 22b.

Figure 2A:
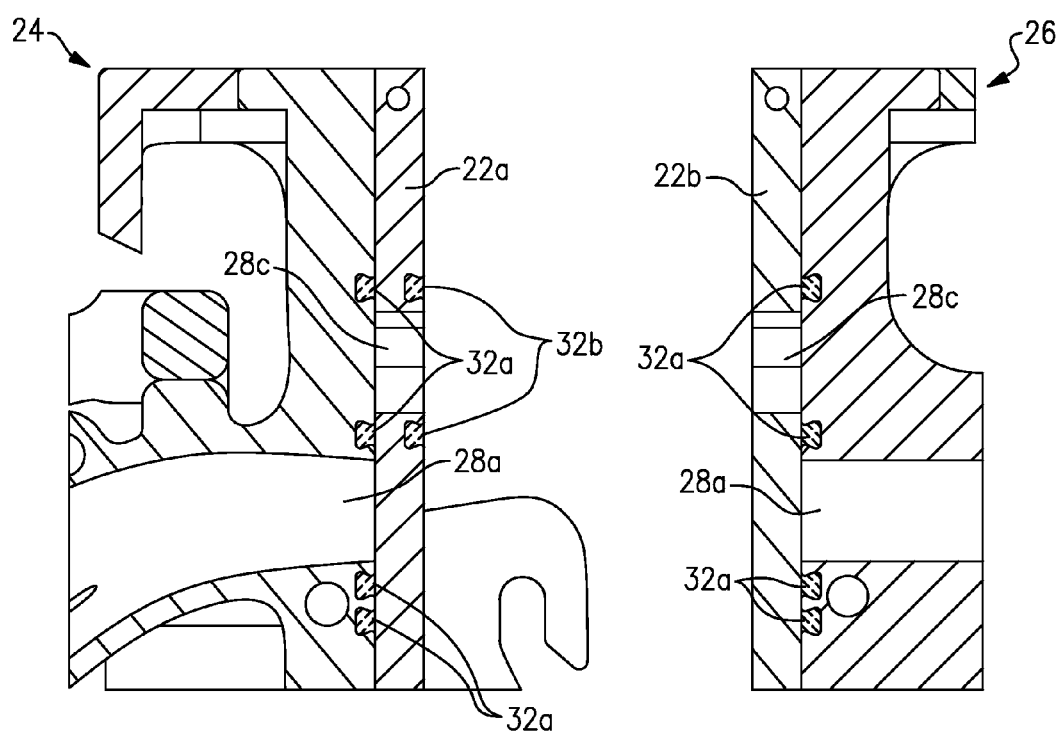
FIG. 2A is a sectional view of the valve.

Referring to FIG. 2A, the first connector 24 and the second connector 26 include the first shutoff gate 22a and the second shutoff gate 22b, respectively. The first connector 24 and the second connector 26 include a plurality of seals 32a to prevent fluid from leaking between the first shutoff gate 22a and the first connector 24 and the second shutoff gate 22b and the second connector 26 during operation of the quick disconnect valve 20. Another plurality of seals 32b are located in the first shutoff gate 22a to seal the fluid flow passages 28c between the first shutoff gate 22a and the second shutoff gate 22b. Although the plurality of seals 32b are shown in the first shutoff gate 22a, the plurality of seals 32b may alternatively be located in the second shutoff gate 22b.

Figure 2B:
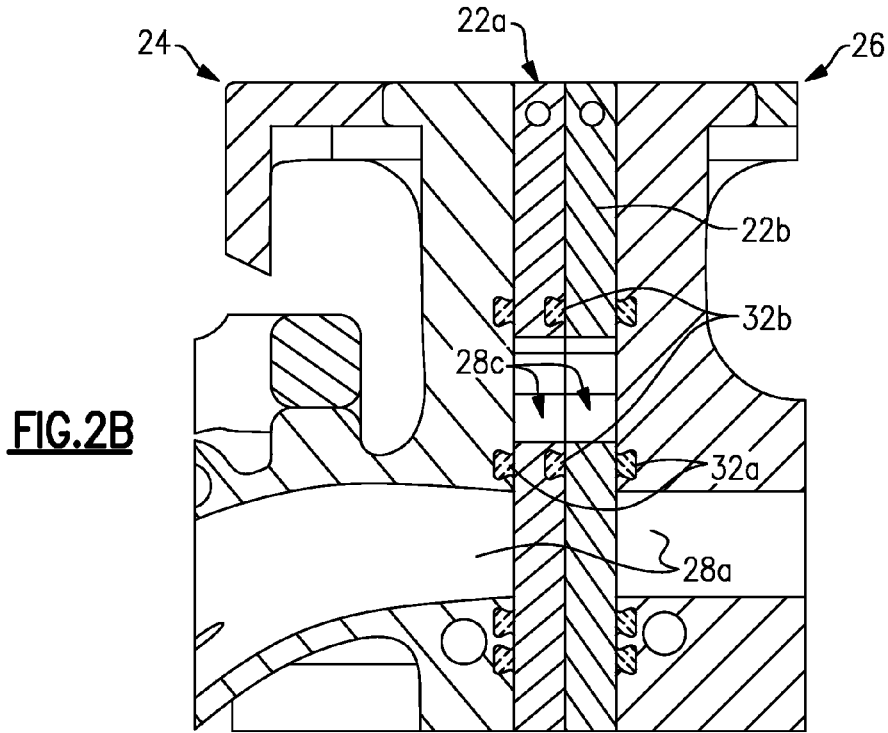
FIG. 2B is another sectional view of the valve.

FIG. 2B illustrates the first connector 24 and the second connector 26 mated together in a fully closed position. The first connector 24 and the second connector 26 are drawn together with enough force to compress the plurality of seals 32b to create a seal between the first shutoff gate 22a and the second shutoff gate 22b.

Figure 2C:
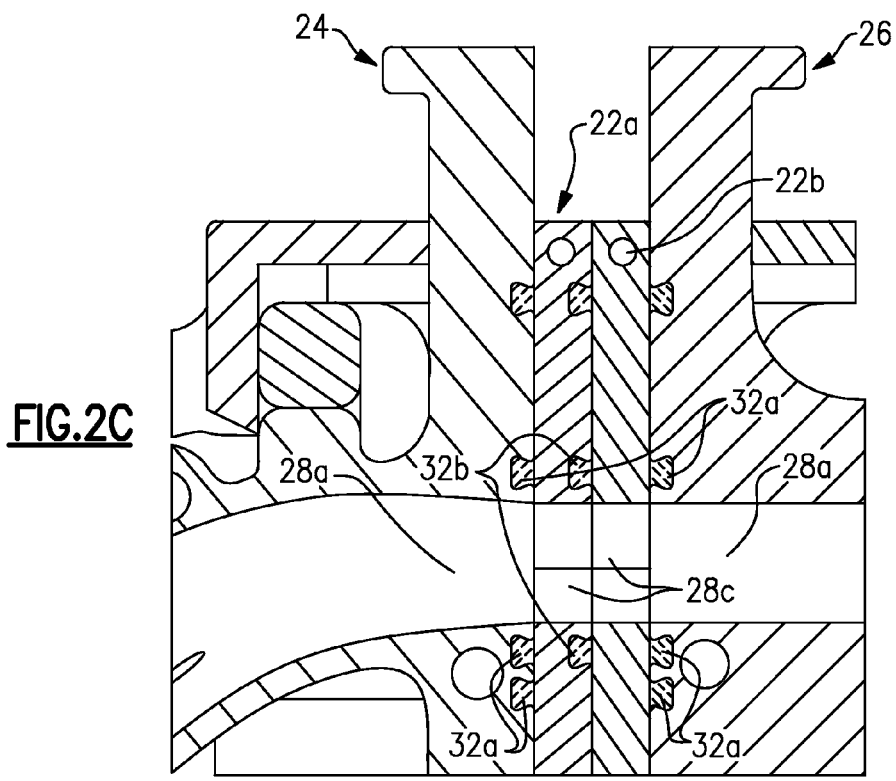
FIG. 2C is another sectional view of the valve.

FIG. 2C illustrates the first connector 24 and the second connector 26 mated together with the first shutoff gate 22a and the second shutoff gate 22b in a fully open position.

FIG. 2D illustrates a plurality of fluid flow passages 28a in the second connector 26 with the plurality of seals 32a located radially outward from the fluid flow passages 28a. The outer most seal of the plurality of seals 32a surrounds the fluid flow passage 28c on the second shutoff gate 22b between the fully closed position (FIG. 2B) and the fully open position (FIG. 2C) of the first shutoff gate 22a and the second shutoff gate 22b. The plurality of seals 32a are also located on the first connector 24 in a similar manner as described above for the second connector 26.

FIG. 3A illustrates a mechanism 36 that magnifies a force applied to a latch handle 34 to mate and de-mate the first connector 24 and the second connector 26. The mechanism 36 includes a plurality of links 36a, 36b, 36c, and 36d. The mechanism 36 shown is a four-bar linkage. The principle of a four-bar linkage is known in relation to magnifying an input force, but not in the context of quick release valves. However, given this description, one of ordinary skill in the art will recognize that a variety of mechanisms could be used, including but not limited to, a two-bar linkage, a screw thread system, or a cam system. The mechanism 36 is attached to an attachment plate 42, the first connector 24 and the latch handle 34. The mechanism 36 is attached to the attachment plate 42 by a plate attachment arm 40. The mechanism 36 causes a crank arm 38 and the plate attachment arm 40 to translate the first connector 24 towards the second connector 26. A plurality of guide pins 50 located on the first connector 24 mate with a plurality of guide slots 48 located on the attachment plate 42 to further facilitate the first connector 24 to translate towards the second connector 26. The plurality of guide pins 50 are located at a first end of the plurality of guide slots 48. Furthermore, a plurality of alignment pins 44 on the first connector 24 mate with a plurality of corresponding alignment receptacles 46 on the second connector 26 during mating.

The linear attachment motion of the first connector 24 and the second connector 26 facilitates a first electrical connection 30a and a second electrical connection 30b to mate when the first connector 24 and the second connector 26 are being drawn together.

The mechanism 36 magnifies the input force to compress the plurality of seals 32b between the first shutoff gate 22a and the second shutoff gate 22b. The mechanism 36 magnifies the force by allowing the crank arm 38 to approach top dead center. Once the crank arm 38 passes top-dead center, the over-center function keeps the connector clamped together without needing to apply a continuous force, since the crank arm never reaches the absolute top-dead center, there is always a force that tries to collapse the mechanism 36. The collapse is inhibited by a mechanical stop 35.

Figure 3B:
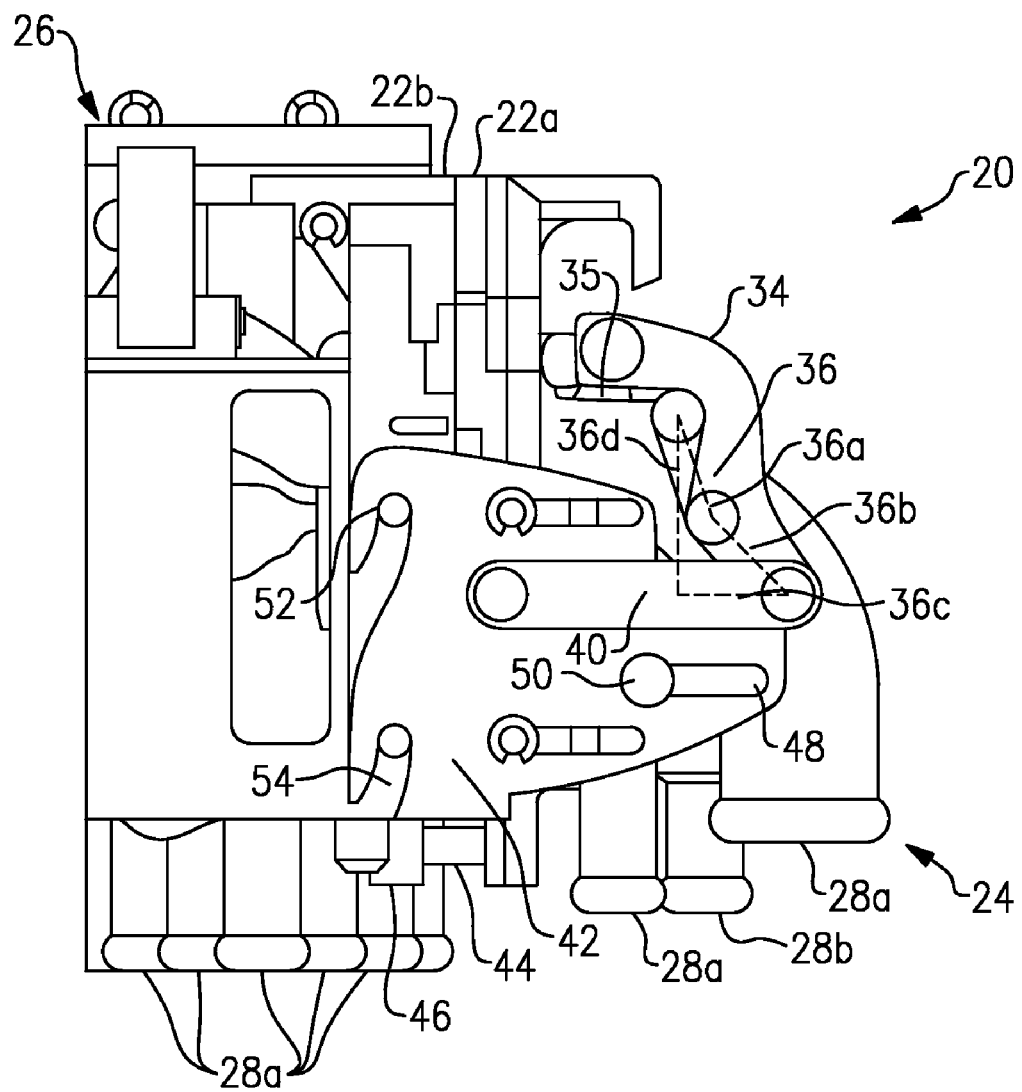
FIG. 3B illustrates another side view of the valve.

FIG. 3B illustrates the first connector 24 and the second connector 26 in a mated position. The first shutoff gate 22a and the second shutoff gate 22b are contacting each other to form a seal around the fluid flow passages 28c. The plurality of guide pins 50 are located at a second end of the plurality of guide slots 48. Furthermore, the plurality of alignment pins 44 are mated with the plurality of corresponding alignment receptacles 46.

Figure 4:
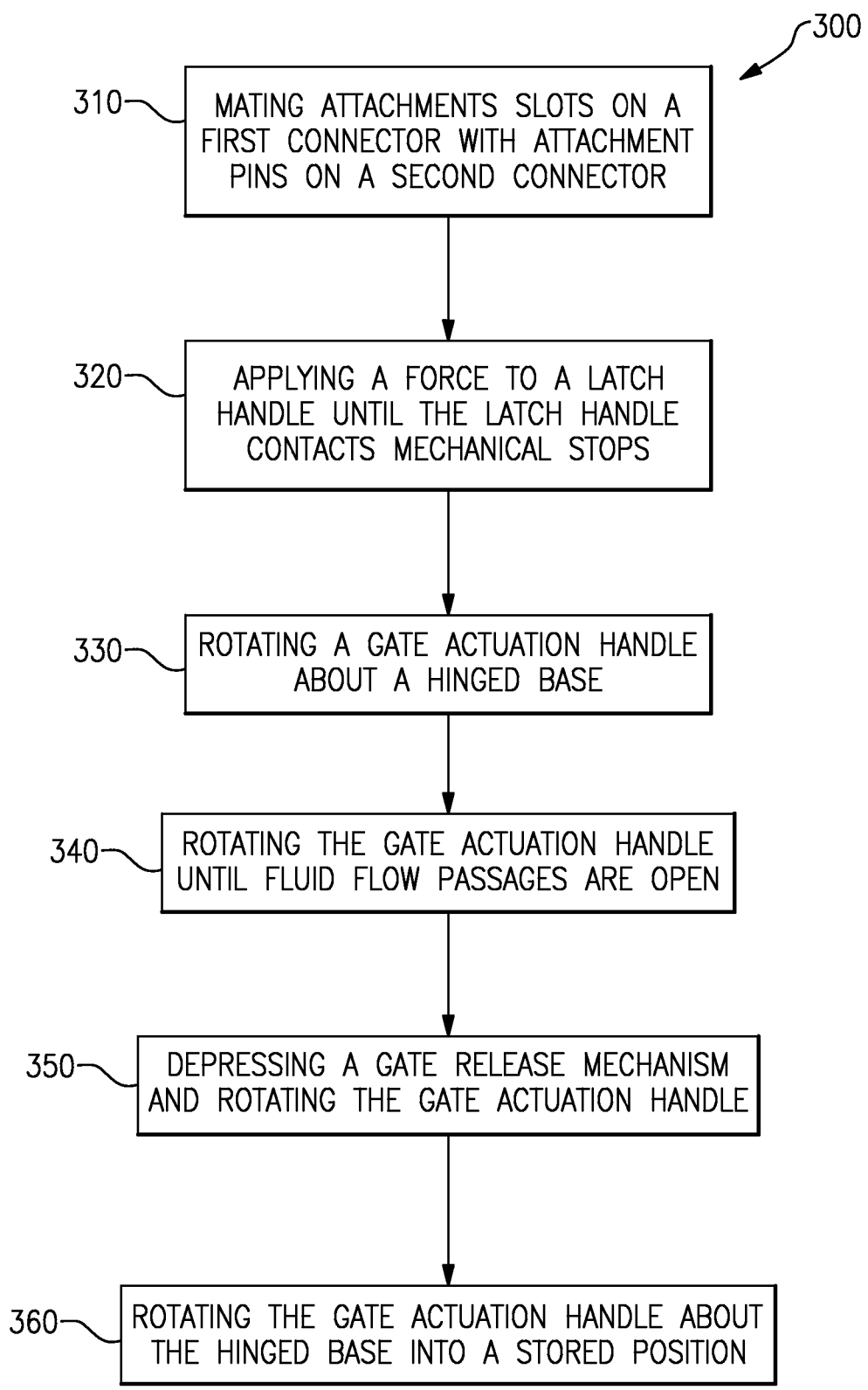
FIG. 4 is a flow chart of an example assembly method.
Figure 5A:
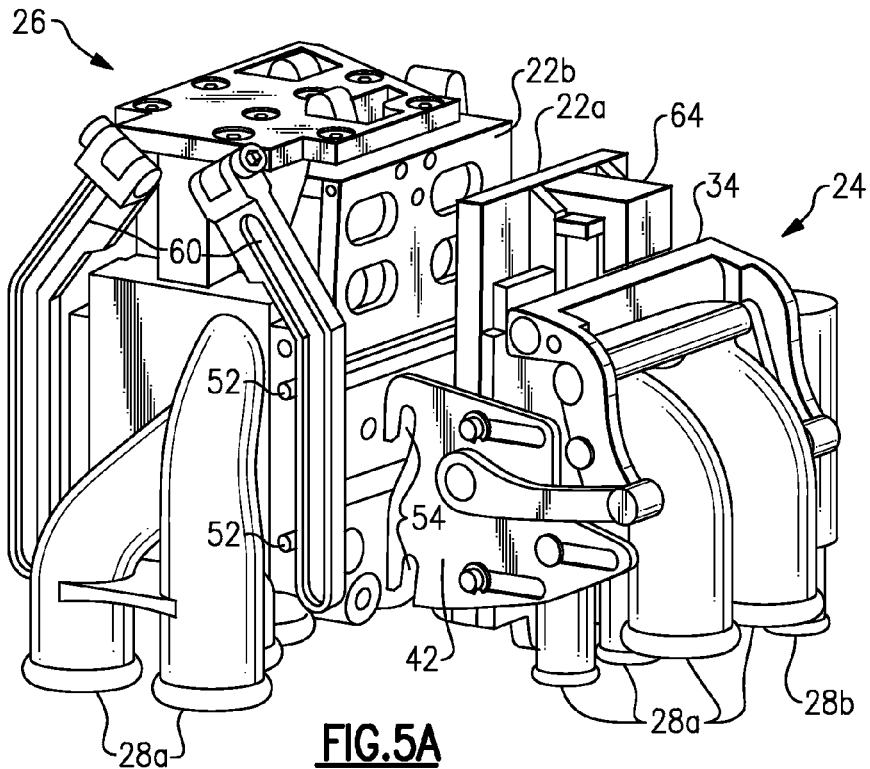
FIG. 5A is a perspective view illustrating a step of the assembly method of FIG. 4.
Figure 5B:
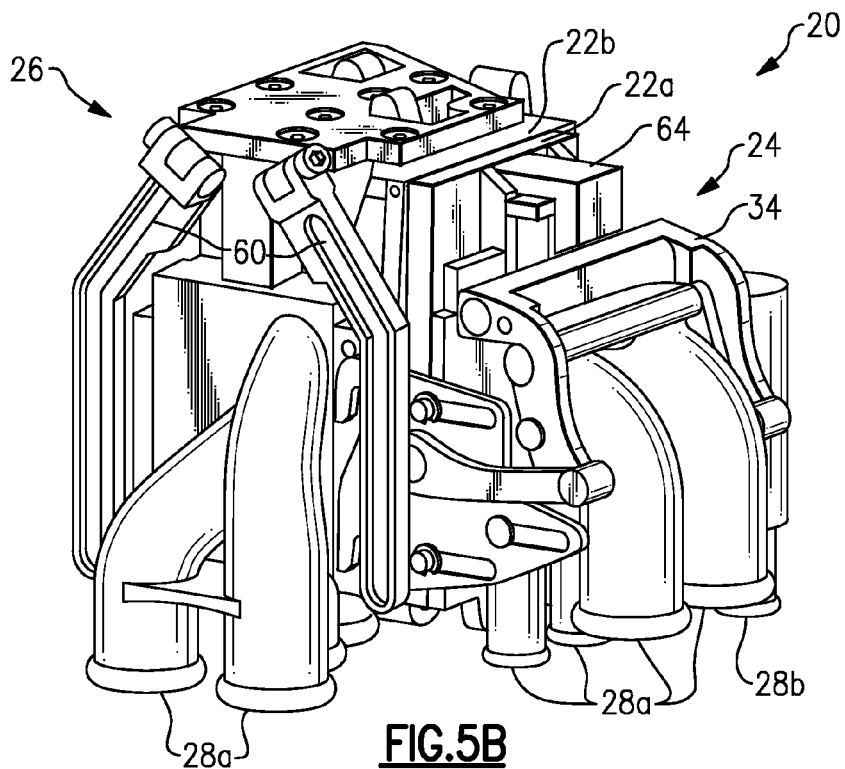
FIG. 5B is a perspective view illustrating another step of the assembly method of FIG. 4.

FIG. 4 is a flow chart of a method 300 of assembling a quick disconnect valve 20 in an uncomplicated manner and facilitates easy user operation. In step 310, a plurality of attachment slots 54 located on the first connector 24 mate with a plurality of attachment pins 52 located on the second connector 26 (FIG. 5A). In step 320, a force is applied to the latch handle 34 to draw the first connector 24 towards the second connector 26 (FIG. 5B).

Figure 5C:
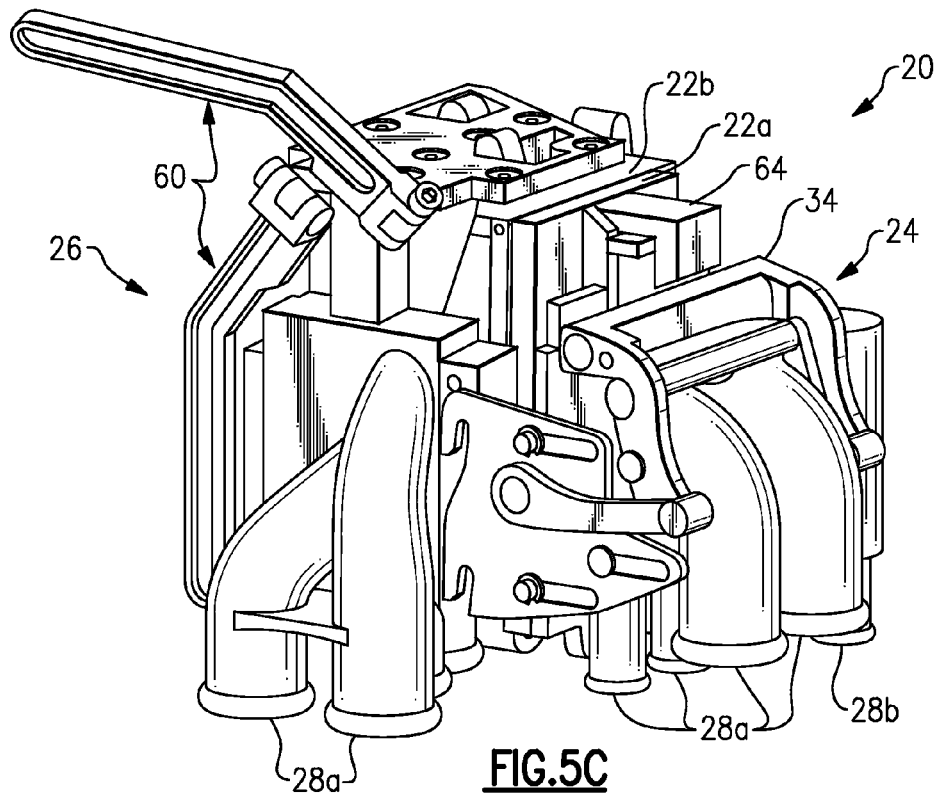
FIG. 5C is a perspective view illustrating another step of the assembly method of FIG. 4.
Figure 5D:
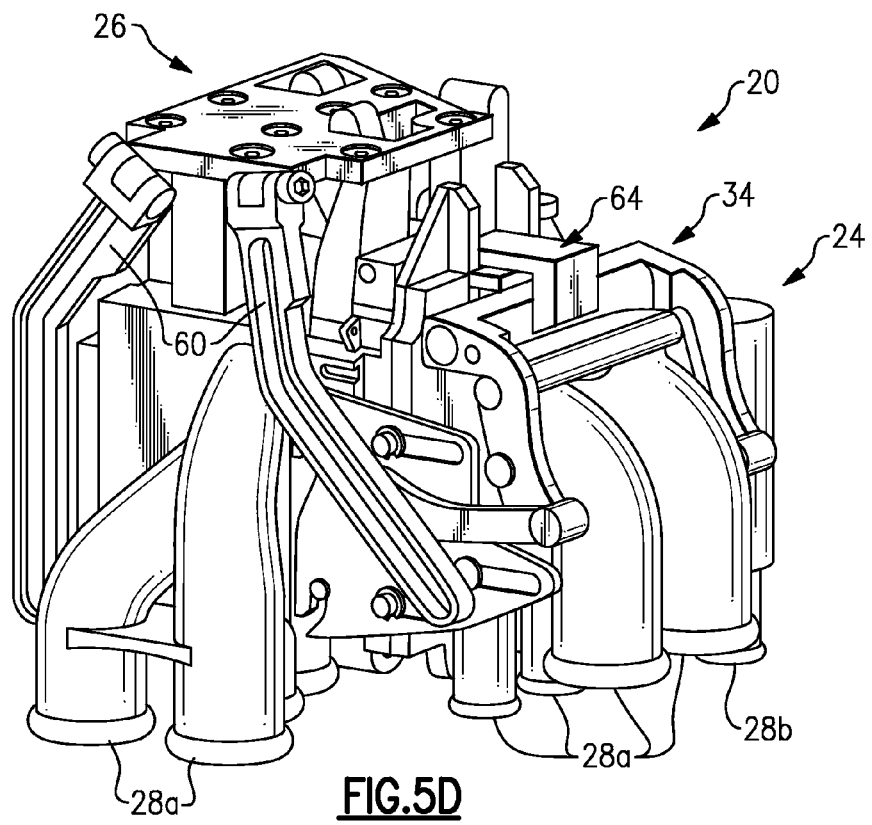
FIG. 5D is a perspective view illustrating another step of the assembly method of FIG. 4.

In step 330, a gate actuation handle 60 is rotated approximately 180 degrees about a spring loaded hinge 62 (FIG. 5C). In step 340, the gate actuation handle 60 is rotated until the first shutoff gate 22a and the second shutoff gate 22b are aligned to allow the fluid to flow through the first connector 24 and the second connector 26. When the first shutoff gate 22a and the second shutoff gate 22b are open, a latch handle lock 64 engages the latch handle 34 to prevent the first connector 24 from separating from the second connector 26 (FIG. 5D).

Figure 5E:
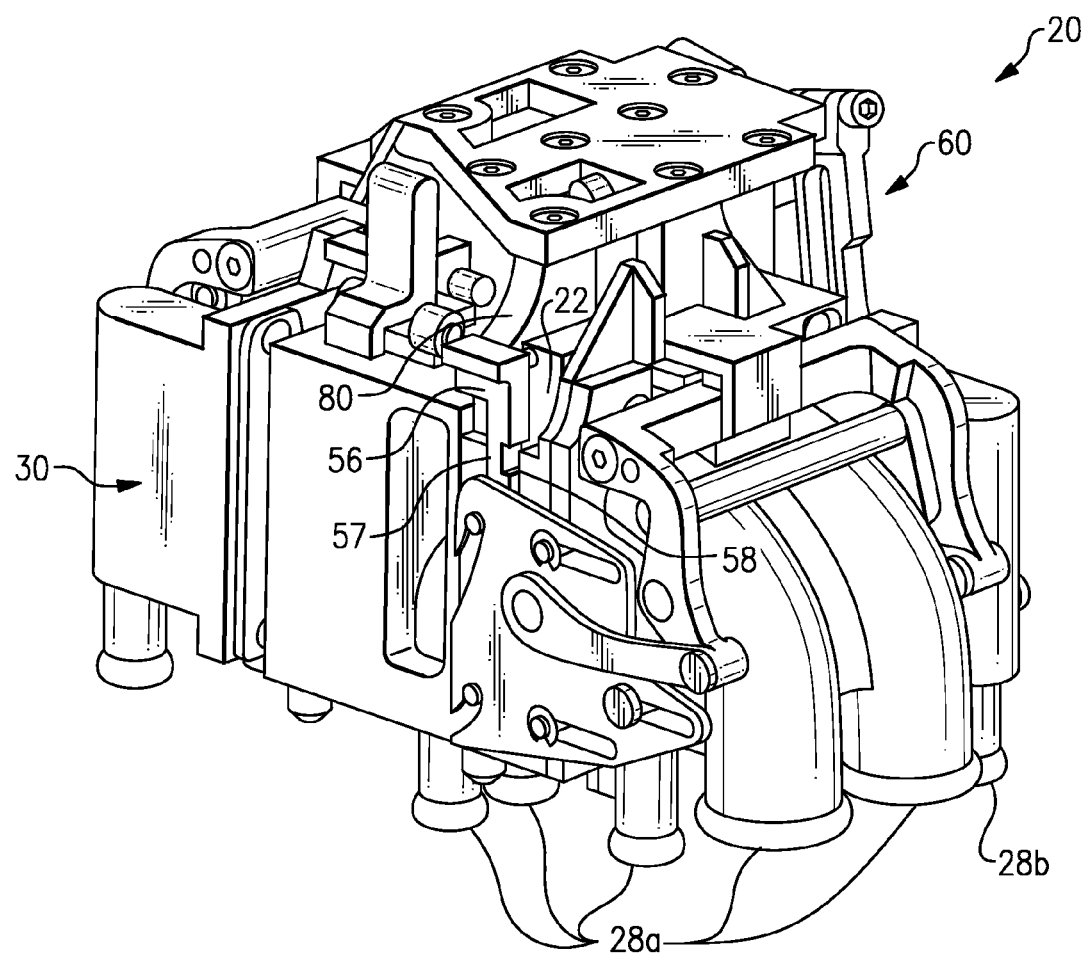
FIG. 5E is a perspective view illustrating another step of the assembly method of FIG. 4.

Once the first shutoff gate 22a and the second shutoff gate 22b are in the fully open position, a two step process is required to move the first shutoff gate 22a and the second shutoff gate 22b to the fully closed position. In step 350, a gate release mechanism 56 must be depressed to extract a release mechanism hook 57 from a mating receptacle 58 (FIG. 5E). Second, while the release mechanism hook 57 is extracted from the mating receptacle 58, the gate actuation handle 60 must be rotated through approximately 180 degrees. In step 360, the gate actuation handle 60 is rotated approximately 180 degrees about the spring loaded hinge 62 to move the gate actuation handle 60 to a stored position.

Although a particular step of sequences are shown, the steps may be performed in any order, separated or combined unless otherwise indicated. It should be further understood that the above mentioned process can be applied to couple multiple first connectors 24 to a single second connector 26.

Figure 6A:
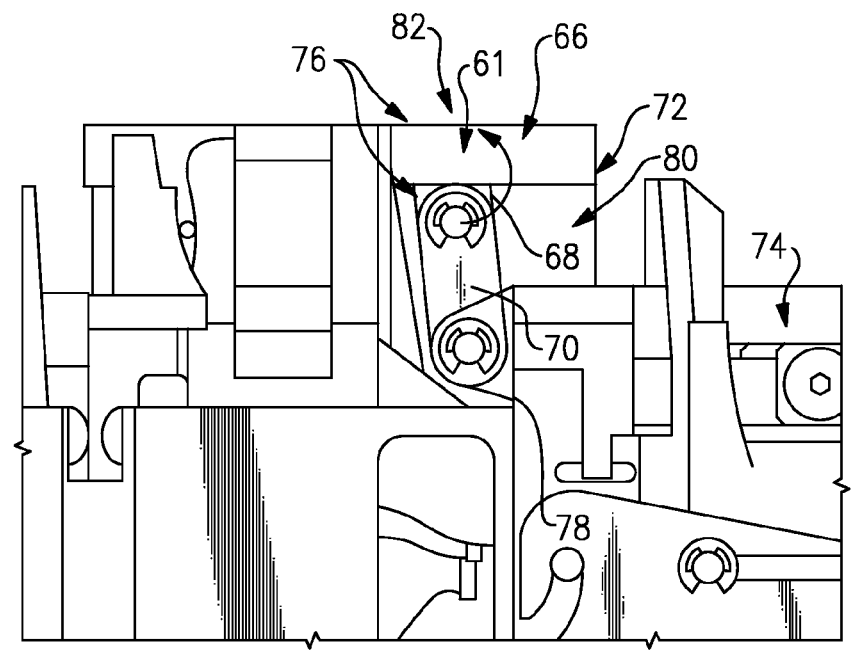
FIG. 6A is a partial sectional view of an example gate actuation mechanism of the valve.

FIG. 6A illustrates a gate actuation linkage 66 with the first shutoff gate 22a and the second shutoff gate 22b in the fully open position. The gate actuation linkage 66 includes an actuation shaft 61. A link arm 70 is attached to the crank arm 68 and the second shutoff gate 22b. As the crank arm 68 is rotated in a counter clockwise direction by the gate actuation handle 60 in communication with the actuation shaft 61, the crank arm 68 approaches bottom-dead center. At bottom-dead center, the two piece crank arm housing 82 is elastically deflected to provide the necessary spring force to give the gate actuation linkage 66 an over-center action. The gate actuation linkage 66 magnifies an input force to overcome the static friction between the plurality of seals 32a located on the first connector 24 and the second connector 26 and the first shutoff gate 22a and second shutoff gate 22b.

Figure 6B:
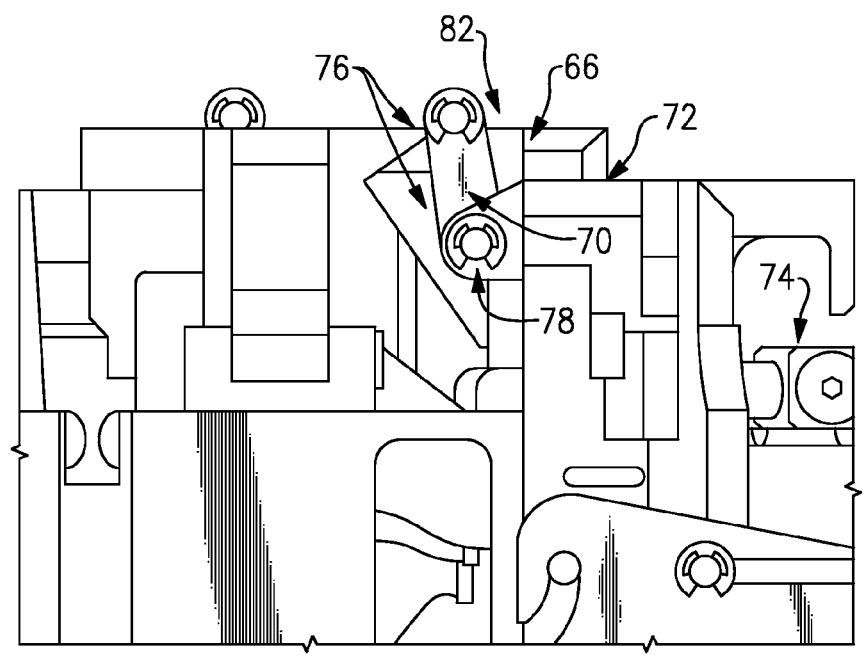
FIG. 6B is another partial sectional view of the example gate actuation mechanism of the valve.

As the crank arm 68 continues to rotate in a counter clockwise direction, the link arm 70 and a slider 78 pull the first shutoff gate 22a and second shutoff gate 22b upward. In addition, the latch handle lock 64 disengages the latch handle 34. As the crank arm 68 approaches top-dead center, the second shutoff gate 22b contacts a mechanical stop 72. This causes the crank arm housing to elastically deform, providing the required spring force to give the mechanism an over-center action. As the crank arm proceeds past top-dead center, the spring force provided by the crank arm housing forces the crank arm 68 against a crank arm mechanical stop 76 (FIG. 6B).

Figure 7:
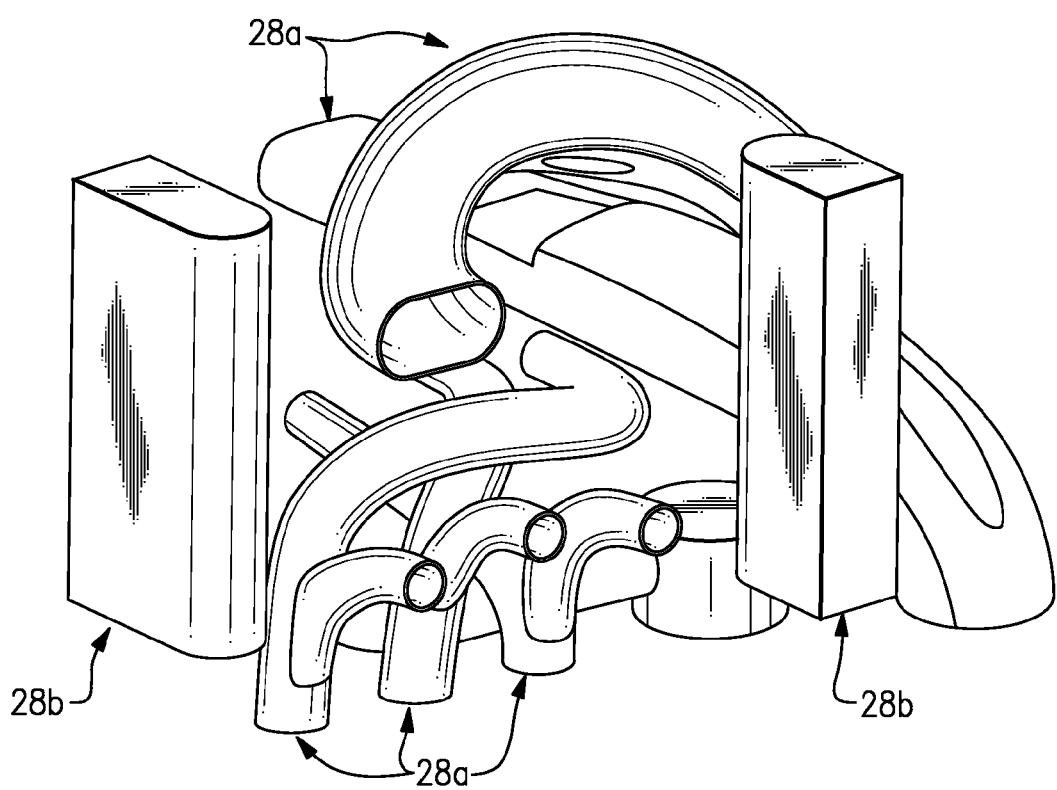
FIG. 7 is a perspective view of a plurality of passages in the valve.

Referring to FIG. 7A, fluid flow passages 28a and electrical passage 28b in the second connector 26 cross over one another to insure that the first connector 24 can be attached to a first side or a second side of the second connector 26.

Figure 8A:
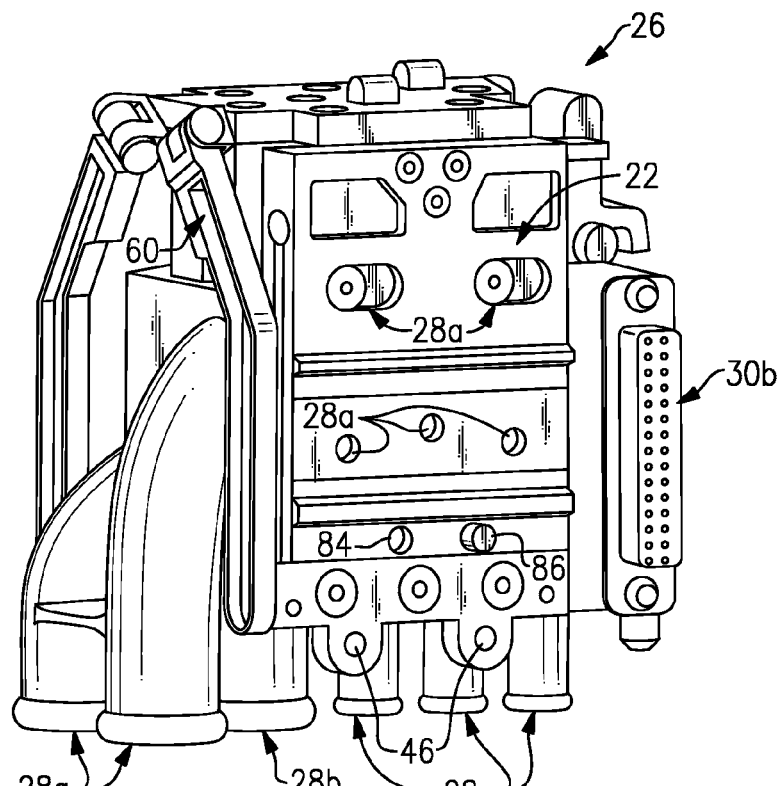
FIG. 8A is a perspective view of a second connector of the valve.
Figure 8B:
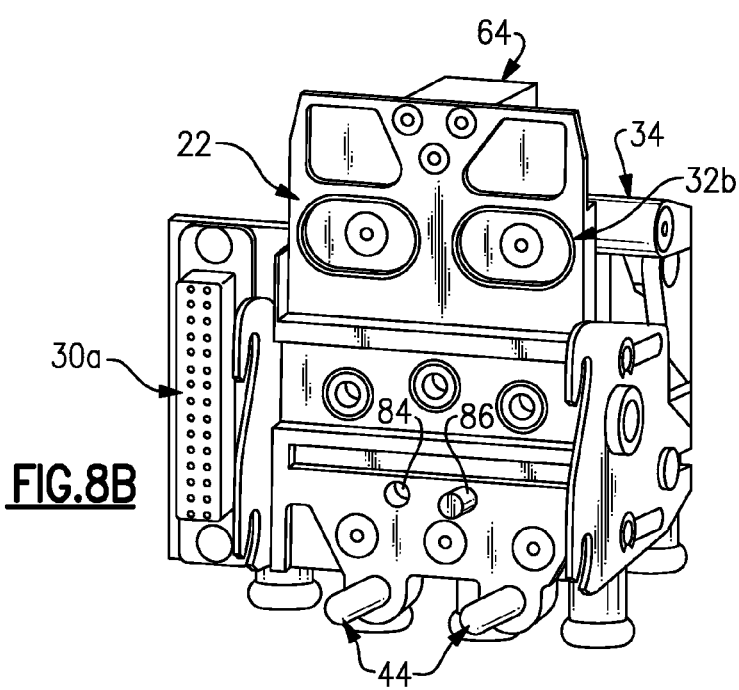
FIG. 8B is a perspective view of a first connector of the valve.
Figure 8C:
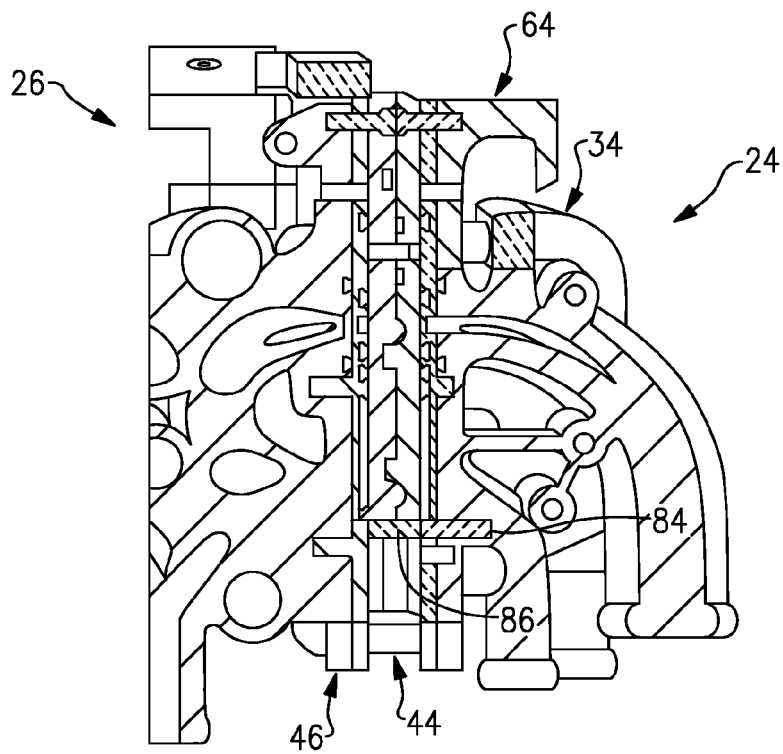
FIG. 8C is another sectional view of the valve.
Figure 8D:
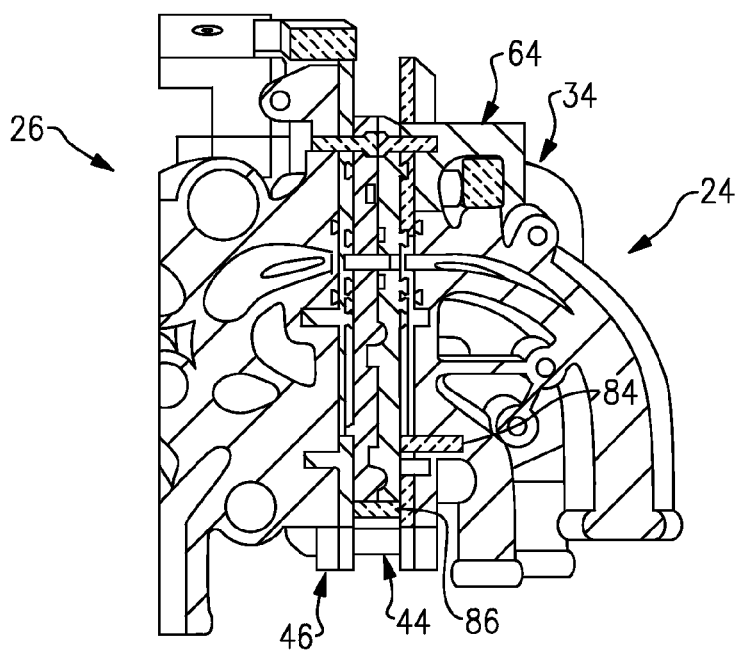
FIG. 8D is another sectional view of the valve.

A passive locking mechanism fixes the first shutoff gate 22a and the second shutoff gate 22b in the fully closed position unless the first connector 24 and the second connector 26 are mated. At least one spring loaded pin 84 and at least one fixed dowel pin 86 are located on the first connector 24 and the second connector 26 (FIG. 8A and FIG. 8B). During mating, the at least one fixed dowel pin 86 on the first shutoff gate 22a forces the at least one spring loaded pin 84 out of engagement with the second shutoff gate 22b and the at least one fixed dowel pin 86 on the second shutoff gate 22b forces the at least one spring loaded pin 84 out of engagement with the first shutoff gate 22a (FIG. 8C). The compressed spring loaded pins 84 remain behind the first shutoff gate 22a and the second shutoff gate 22b to allow the quick disconnect valve 20 to move between a fully closed position (FIG. 8C) and a fully open position (FIG. 8D).

Figure 9A:
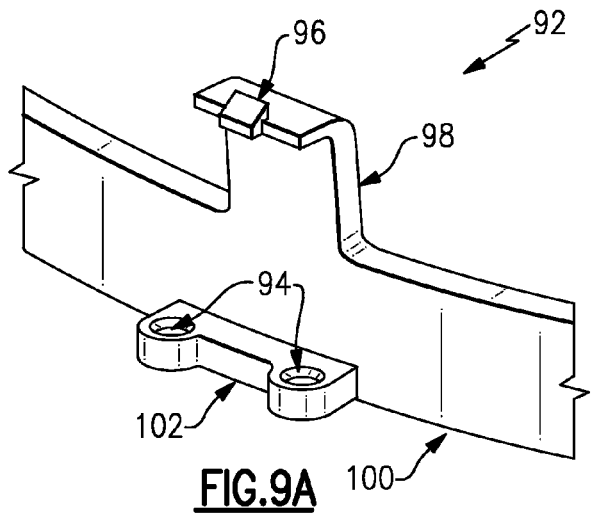
FIG. 9A is a perspective view of an example valve attachment device.
Figure 9B:
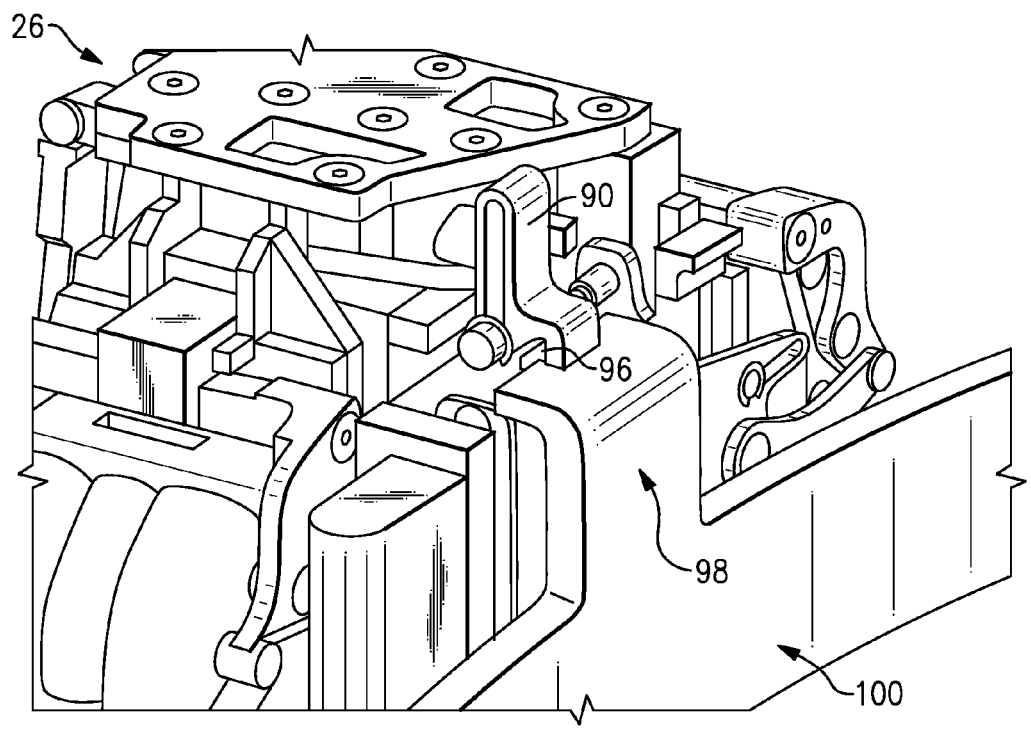
FIG. 9B is a perspective view of an example valve mounting system.

FIG. 9A illustrates a perspective view of an example valve attachment device 92. The valve attachment device 92 includes a strap 100 with a mounting wedge 96 located on a first extending portion 98 and a plurality of mounting receptacles 94 located on a second extending portion 102. A plurality of mounting pins 88 located on the second connector 26 mate with the plurality of mounting receptacles 94. Once the plurality of mounting pins 88 have mated with the plurality of mounting receptacles 94, the second connector 26 rotates towards the valve attachment device 92 to engage the mounting wedge 96 with a spring loaded clasp 90 on the second connector 26 (FIG. 9B).

The second connector 26 is released from the valve attachment device 92 by applying a force to the spring loaded clasp 90 in a direction towards the second connector 26 and rotating the second connector 26 away from the valve attachment device 92. When the mounting wedge 96 has cleared the spring loaded clasp 90, the second connector 26 can be lifted from the valve attachment device 92, separating the plurality of mounting pins 88 from the plurality of mounting receptacles 94.

Figure 10A:
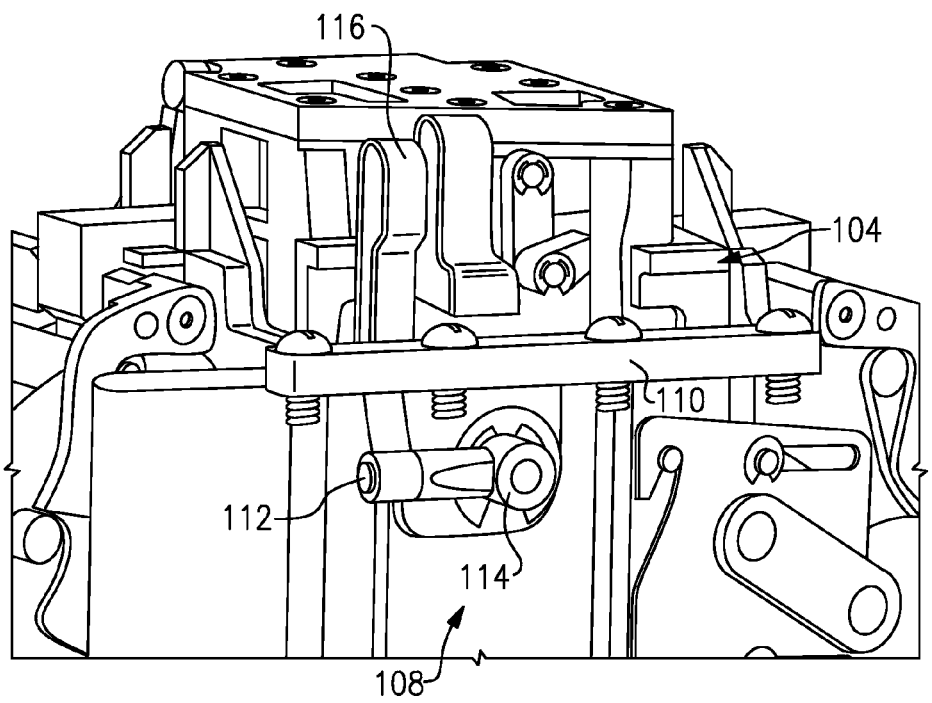
FIG. 10A is a perspective view of another embodiment of a valve mounting system.

FIG. 10A illustrates another embodiment of an example valve mounting system 104 including a first half 108 and a second half 110. The first half 108 attaches to the second connector 26 in a similar manner to the valve mounting system described in FIGS. 9A-B above.

Figure 10B:
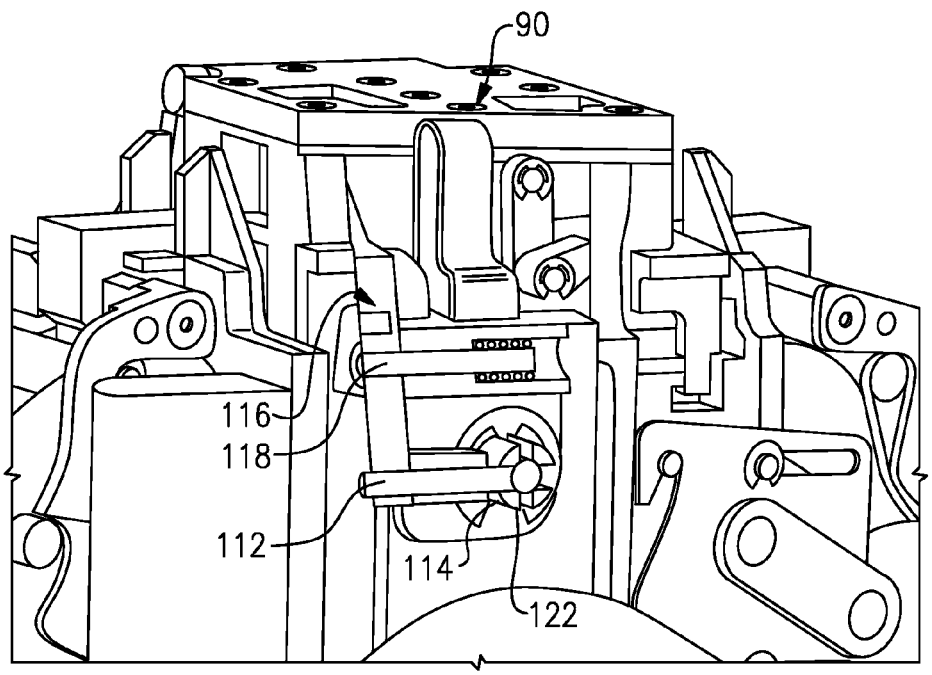
FIG. 10B is a sectional view of the valve mounting system of FIG. 10A.
Figure 10C:
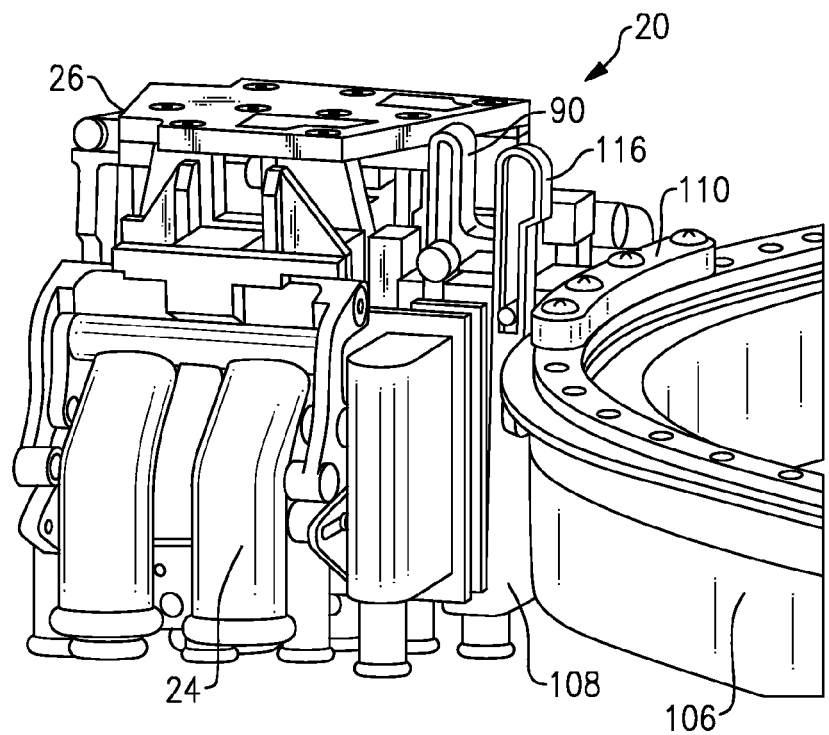
FIG. 10C is another perspective view of the valve mounting system of FIG. 10A.
Figure 10D:
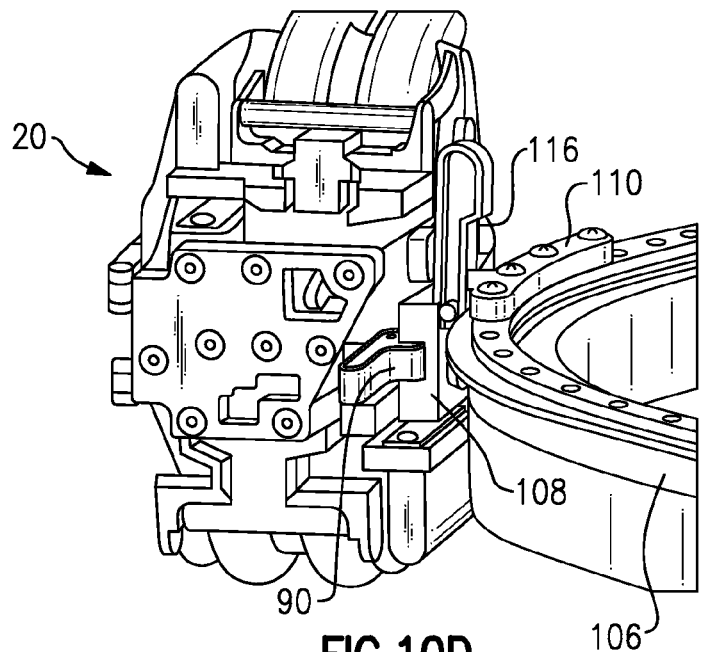
FIG. 10D is another perspective view of the valve mounting system of FIG. 10A.

The second half 110 is attached to the first half 108 by a main pivot 114. The second half 110 is also attachable to a band 106. A locking handle 116 is pivoted about a spring loaded pin 118. A lock pin 112 is located at a distal end of the locking handle 116. The lock pin 112 mates with at least one main pivot receptacle 122 to secure the first half 108 and the second half 110 in a fixed orientation. The lock pin 112 is released from the at least one main pivot receptacle 122 by applying a force to the locking handle 116 in a direction towards the second connector 26 and pivoting the first half 108 and the second half 110 about the main pivot 114 (FIG. 10B). The spring loaded pin 118 returns the locking handle 116 to its original position and replaces the lock pin 112 in the at least one main pivot receptacle 122 corresponding to the rotational position of the first half 108 and the second half 110 (FIG. 10 C-D).

Figure 11A:
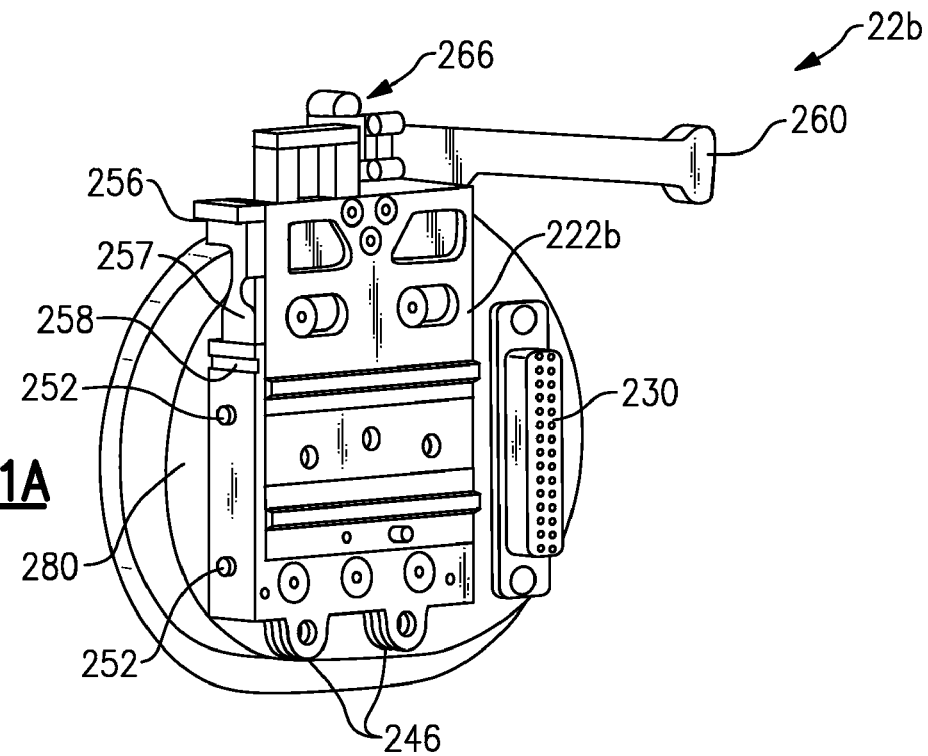
FIG. 11A is a perspective front view of another embodiment of a valve.

FIG. 1A illustrates a front perspective view of another embodiment of an integrated second connector 226. The embodiment of the FIG. 11A is generally the same as described above except where noted or shown in the drawings. The integrated second connector 226 is attached directly to the specialized suit 227 by a housing 280 (FIG. 11C). The specialized suit may be a space suit or another life support suit. The integrated second connector 226 does not include fluid flow passages 228a that crossover one another to allow multiple first connectors 24 to mate with the integrated second connector 226. Also, the gate actuation linkage 266 operates in a plane parallel to the second shutoff gate 222b.

Figure 11B:
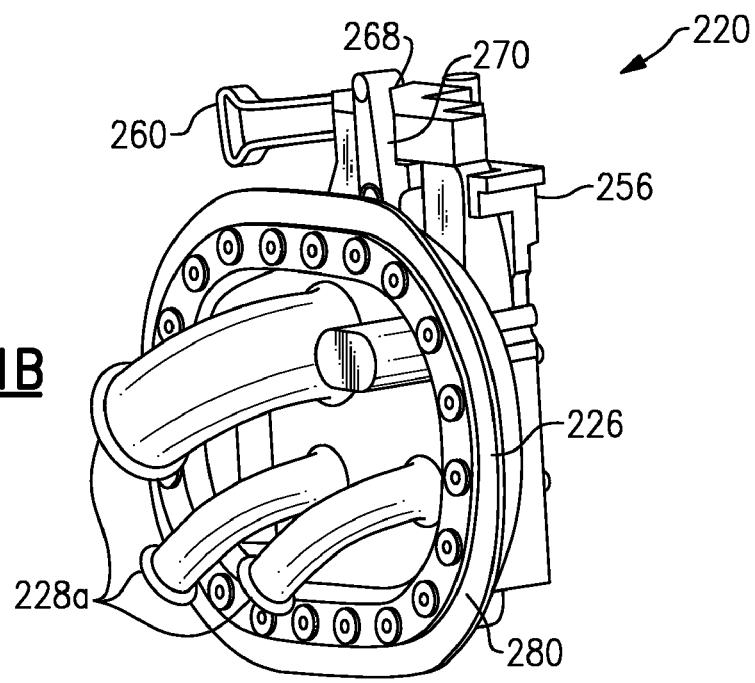
FIG. 11B is a perspective rear view of the valve of FIG. 11A.
Figure 11C:
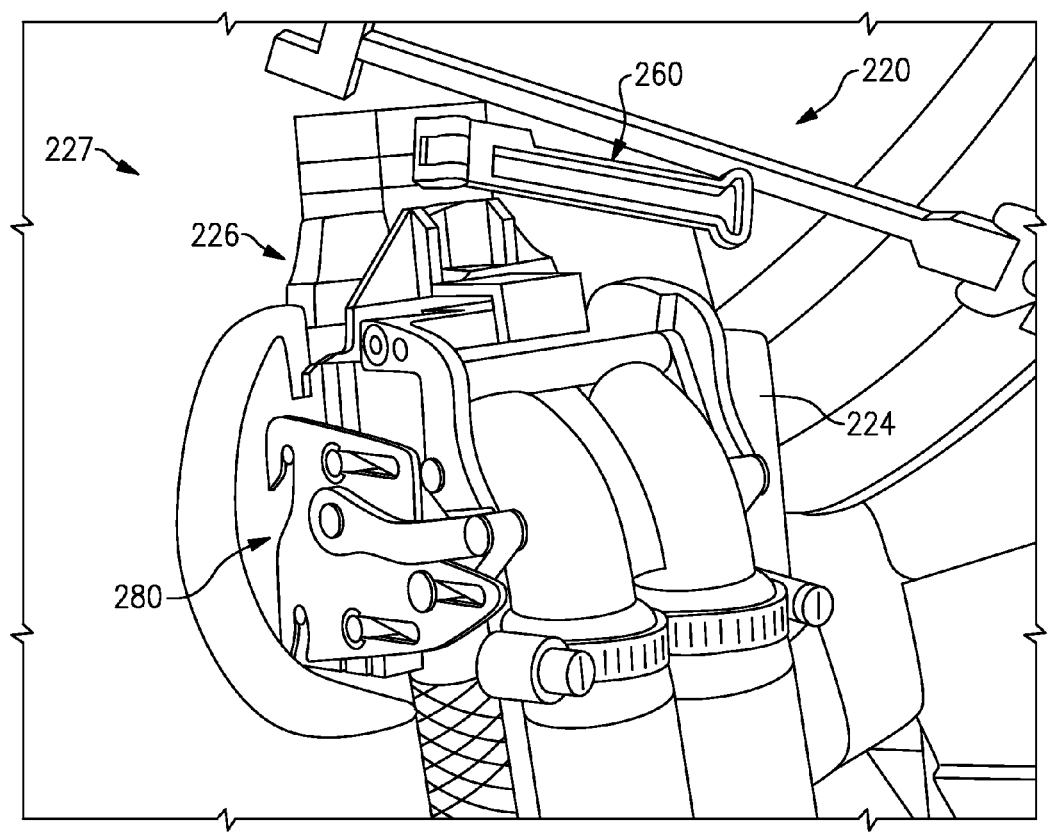
FIG. 11C is a perspective view of the valve of FIG. 11A.

FIG. 11B illustrates a rear perspective view of the integrated second connector 226 of FIG. 11A. The integrated second connector 226 includes a plurality of fluid flow passages 228a that extend though the housing 280.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than specifically described. For that reason the following claims should be studied to determine the true scope and content of this invention.

What is claimed is:

1. A quick disconnect valve assembly comprising:
a first connector including a first passage, a first seal and a second seal surrounding the first passage, and a first shutoff gate moveable relative to the first passage, the first shutoff gate including a first aperture;
a second connector including a second passage, a first seal and a second seal surrounding the second passage, and a second shutoff gate moveable relative to the second passage, the second shutoff gate including a second aperture; and
wherein the second seal is located radially outward and circumscribes the first seal and each of the first shutoff gate and the second shutoff gate are moveable in unison between an open position with the first aperture at least partially aligned with the second aperture to allow flow between the first passage and the second passage and a closed position fluidly blocking flow between the first passage and the second passage.

2. The assembly as recited in claim 1, wherein a seal is located in the first shutoff gate or the second shutoff gate and surrounds the first aperture and the second aperture.

3. The assembly as recited in claim 1, wherein the second connector is integrally attached to a life support suit.

4. The assembly as recited in claim 1, wherein a valve attachment device mates with the second connector.

5. The assembly as recited in claim 1, wherein the first seal is substantially circular and the second seal is substantially elliptical.

6. The assembly as recited in claim 1, wherein the first seal and the second seal are located in the same plane.

7. The assembly as recited in claim 1, wherein the first connector and the second connector include multiple passages and a first seal and a second seal surround each of the passages.

8. A quick disconnect valve assembly comprising:
a first connector including a first passage and a first shutoff gate moveable relative to the first passage, the first shutoff gate including a first aperture;
a second connector including a second passage and a second shutoff gate moveable relative to the second passage, the second shutoff gate including a second aperture; and
wherein each of the first shutoff gate and the second shutoff gate are moveable in unison between an open position with the first aperture at least partially aligned with the second aperture to allow flow between the first passage and the second passage and a closed position fluidly blocking flow between the first passage and the second passage, and wherein the first connector includes a first electrical connection and the second connector includes a second electrical connection connectable with the first electrical connection.

9. A quick disconnect valve assembly comprising:
a first connector including a first passage and a first shutoff gate moveable relative to the first passage, the first shutoff gate including a first aperture;
a second connector including a second passage and a second shutoff gate moveable relative to the second passage, the second shutoff gate including a second aperture; and
wherein each of the first shutoff gate and the second shutoff gate are moveable in unison between an open position with the first aperture at least partially aligned with the second aperture to allow flow between the first passage and the second passage and a closed position fluidly blocking flow between the first passage and the second passage, and wherein the first shutoff gate and the second shutoff gate include at least one spring loaded pin and at least one fixed dowel.

10. The assembly as recited in claim 9, wherein the at least one fixed dowel engages the at least one spring loaded pin during mating to release a locking mechanism.

11. A quick disconnect valve assembly comprising:
a first connector including a first passage and a first shutoff gate moveable relative to the first passage, the first shutoff gate including a first aperture;
a second connector including a second passage and a second shutoff gate moveable relative to the second passage, the second shutoff gate including a second aperture; and
wherein each of the first shutoff gate and the second shutoff gate are moveable in unison between an open position with the first aperture at least partially aligned with the second aperture to allow flow between the first passage and the second passage and a closed position fluidly blocking flow between the first passage and the second passage, and wherein the first shutoff gate and the second shutoff gate are in communication with a gate actuation linkage.

12. The assembly as recited in claim 11, wherein a gate actuation handle is in communication with the gate actuation linkage to move the first shutoff gate and the second shutoff gate between the open position and the closed position.

13. A quick disconnect valve assembly comprising:
a first connector including a first passage and a first shutoff gate moveable relative to the first passage, the first shutoff gate including a first aperture;
a second connector including a second passage and a second shutoff gate moveable relative to the second passage, the second shutoff gate including a second aperture; and
wherein each of the first shutoff gate and the second shutoff gate are moveable in unison between an open position with the first aperture at least partially aligned with the second aperture to allow flow between the first passage and the second passage and a closed position fluidly blocking flow between the first passage and the second passage, and wherein a gate release mechanism locks the first shutoff gate and the second shutoff gate in a fully open position.

14. A quick disconnect valve assembly comprising:
a first connector including a first passage and a first shutoff gate moveable relative to the first passage, the first shutoff gate including a first aperture;
a second connector including a second passage and a second shutoff gate moveable relative to the second passage, the second shutoff gate including a second aperture; and
wherein each of the first shutoff gate and the second shutoff gate are moveable in unison between an open position with the first aperture at least partially aligned with the second aperture to allow flow between the first passage and the second passage and a closed position fluidly blocking flow between the first passage and the second passage, and wherein the valve attachment device mates with the second connector in a plurality of rotational positions.

15. A quick disconnect valve assembly comprising:
a first connector including a first passage and a first shutoff gate moveable relative to the first passage, the first shutoff gate including a first aperture;
a second connector including a second passage and a second shutoff gate moveable relative to the second passage, the second shutoff gate including a second aperture; and
wherein each of the first shutoff gate and the second shutoff gate are moveable in unison between an open position with the first aperture at least partially aligned with the second aperture to allow flow between the first passage and the second passage and a closed position fluidly blocking flow between the first passage and the second passage, and wherein a latch handle mates the first connector and the second connector.

* * * * *